United States Patent [19]

Thinschmidt et al.

[11] Patent Number: 4,561,118
[45] Date of Patent: Dec. 24, 1985

[54] BUS SYSTEM WITH OPTICAL WAVEGUIDES HAVING COLLISION DETECTION

[75] Inventors: Hans Thinschmidt, Germering; Rudolf Mittelmann, Ottobrunn, both of Fed. Rep. of Germany

[73] Assignee: Siemens Aktiengesellschaft, Berlin & Munich, Fed. Rep. of Germany

[21] Appl. No.: 493,038

[22] Filed: May 9, 1983

[30] Foreign Application Priority Data

Jun. 30, 1982 [DE] Fed. Rep. of Germany ....... 3224425

[51] Int. Cl.⁴ ............................................... H04B 9/00
[52] U.S. Cl. ..................................... 455/608; 455/612; 455/607; 370/4; 340/825.5
[58] Field of Search ............... 455/612, 617, 618, 619, 455/606, 607, 608; 375/17, 59, 68, 71; 370/4, 85, 94, 1; 340/825.5

[56] References Cited

U.S. PATENT DOCUMENTS

| | | | |
|---|---|---|---|
| 4,061,881 | 12/1977 | Widl | |
| 4,236,256 | 11/1980 | Brackett et al. | 455/608 |
| 4,345,250 | 8/1982 | Jacobsthal | 370/85 |
| 4,376,278 | 3/1983 | Jacobsthal | 340/825.5 |
| 4,384,363 | 5/1983 | Lipcon | 455/58 |
| 4,408,353 | 10/1983 | Bowen et al. | 455/606 |
| 4,417,334 | 11/1983 | Gunderson et al. | 370/1 |
| 4,431,916 | 2/1984 | Couch | 455/619 |
| 4,531,238 | 7/1985 | Rawson et al. | 455/601 |

OTHER PUBLICATIONS

"Fibernet: Multimode Optical Fibers for Local Computer Networks", by Rawson et al., IEEE Transactions on Communications, vol. COM 26, No. 7, Jul. 1978.
Einsatz eines Lichtwellenleiter-Bussystems in einer verteilten Multimikrocomputerstruktur, Siemens Forsch.-u. Entwickl.-Ber. vol. 9, (1980), No. 1, Springer-Verlag, 1980, by A. Sauer et al.

Primary Examiner—Joseph A. Orsino, Jr.
Assistant Examiner—Timothy K. Greer
Attorney, Agent, or Firm—Hill, Van Santen, Steadman & Simpson

[57] ABSTRACT

Given a bus system comprising an optical waveguide, an electro-optical transmitter, and an opto-electrical receiver, the transmitter is constructed such that the light power coupled into the light waveguide and dependent on the information signal to be transmitted is variable in digital steps. The receiver is comprised of DC-coupled amplifiers without gain control. It contains a preliminary stage for generating a useful signal from the light signal, and has a first comparator stage for generating the information signal from the useful signal. The receiver also includes a second comparator stage to which a reference voltage variable in digital stages is supplied and which samples the level of the useful signal emitted by the preliminary stage. The second comparator stage emits a collision signal when the useful signal moves the reference voltage upwardly and thus indicates that at least two transmitters are coupling light into the optical waveguide. The structure of the transmitter and of the receiver enables a DC transmission circuit having the special advantages of the optical waveguide. By means of the adjustment of the transmitters and of the receivers, moreover it can be achieved that the simultaneous access of a plurality of transmitters to the optical waveguide can be determined from the height of the level of the useful signal emitted by the preliminary stage.

17 Claims, 9 Drawing Figures

BUS SYSTEM WITH OPTICAL WAVEGUIDES HAVING COLLISION DETECTION

BACKGROUND OF THE INVENTION

The invention relates to a bus system with optical waveguides wherein the information signal to be transmitted is converted by an electro-optical transmitter into a light signal. This signal is coupled into an optical waveguide and transmitted thereover to an opto-electrical receiver where it is converted into an electrical use signal from which the information signal is regained. The system is particularly useful for multi-computer systems with a local optical bus with a star coupler.

Suitable transmission paths for the communication of computers with one another are required in local networks with multi-computer arrangements. The computers can be fundamentally interconnected as a star, as a ring, or over a bus. Extensive demands are made on the transmission circuit in a bus system, and specifically of the bus. For example, the transmission of the information must occur at a high rate and with high accuracy. Regaining the clock at the receive side requires a corresponding coding of the information. A collision recognition must be provided, this recognition occurring when a plurality of computers begin to transmit simultaneously.

It is known to construct multi-computer systems wherein an optical waveguide is employed for the bus (for example, Siemens Forshungs-und Entwicklungsberichte, Vol. 9, 1980, No. 1, pp. 33–37; IEEE Transactions on Communications, Vol. Com.-26, No. 7, July 1978, pp. 983–990, both incorporated herein by reference). In these multi-computer arrangements with an optical waveguide bus, the information signals are converted with the assistance of an electro-optical transmitter into light signals which are coupled into the optical waveguide by the transmitter. These signals are transmitted over the optical waveguide to the computers connected to the bus, and are transmitted with, for example, the assistance of a star coupler. An opto-electrical receiver can in turn convert the light signals back into electrical information signals which are then processed in the computer in the standard manner. AC-coupled, controlled-gain amplifiers have been hitherto employed for such opto-electrical receivers. The control time constants existing in such amplifiers, however, are an impediment in the bus operation since the level zero prevails on the bus between each transmitted information. Special codings, for example, the Manchester code, are employed at the receive side for regaining the clock, this resulting in a loss of band width. Alternatively, one may employ scramblers and PLL circuits which result in considerable expense. The collision recognition, finally, is carried out by means of information comparison. As a result, however, only the computers participating in the collision can perceive the collision.

SUMMARY OF THE INVENTION

An object underlying the invention is to specify a bus system with an optical waveguide, an electro-optical transmitter, and an opto-electrical receiver which is designed such that the special advantages of the optical waveguide are combined with a DC transmission circuit in the receiver. Given a bus system of the type initially cited, this object is achieved by means of a transmitter whose light power coupled into the optical waveguide and dependent on the information signals is variable in digital steps. A receiver is constructed of DC-coupled amplifiers without gain control which exhibits an input stage for generating the useful signal. A first comparator stage generates the information signal from the useful signal. A second comparator stage is provided to which a reference voltage variable in digital steps is supplied, and which samples the level of the useful signal and emits a collision signal when the useful signal exceeds the reference voltage.

It is expedient for the purpose of generating a reference voltage for the first comparator stage to insert a sampling stage between the input stage and the comparator stages, said sampling stage generating the reference signal for the first comparator stage from the useful signal. This sampling stage can thereby be constructed such that the reference signal automatically adjusts to the center level of the useful signal for each information block to be evaluated for the purpose of a center sampling of the useful signal.

The input stage for generating the useful signal from the light signal can consist of a series connection having an avalanche photodiode and a resistor, of a first operational amplifier, and of a voltage divider. The non-inverting input of the operational amplifier is thereby connected to the junction of the series circuit comprised of the avalanche photodiode and the resistor. The inverting input of the first operational amplifier is connected to the voltage divider. A simply constructed input stage which converts the light signal into an electrical useful signal and amplifies it is thus available.

The second comparator stage for generating the collision signal can expediently be comprised of a second operational amplifier whose one input is connected to the output of the first operational amplifier of the input stage and whose other input is connected to a junction between a resistor and a digitally variable constant current source. The reference voltage adjacent to the second operational amplifier can likewise be set in digital steps by means of varying the current of the constant current source in digital steps. It is thus possible to match the second comparator stage serving for collision recognition to the demands of the bus system. The level of the light signal occurring at the input of a mixer, for example, of a star coupler, can be set to a specific value with the assistance of the digitally variable transmitter. It is thus possible to set the same level of the light signals at the input of the mixer for all transmitters functioning on the bus. The time when the second comparator stage emits the collision signal can be determined with the assistance of the constant current source being variable in digital steps on the receive side. Since the light signals at the input of the mixer and emitted by the various transmitters must have the same level (i.e. are standardized), a collision will be present (a plurality of transmitters simultaneously working on the bus) when the level of the useful signal in comparison to the collision-free case assumes approximately at least twice the value as in the collision-free case. The reference voltage can be separately correspondingly set for each receiver connected to the bus with the assistance of the digitally variable constant current source.

A clock signal specifying when the information signal emitted by the first comparator stage must be evaluated must be generated at the receive side in order to evaluate the information. The coding which is employed for transmitting the information over the bus can, for example, be employed for generating the clock signal. A circuit arrangement for generating the clock becomes particularly simple given the inventive bus system when a special trinary code is employed wherein the light signals generated by the transmitter from a 2-level information signal are 3-level. This code is constructed such that a change of the level of the light signal is generated for each bit of the information signal to be transmitted.

Particular advantages of the inventive bus system are that the opto-electrical receiver is exclusively constructed from DC-coupled amplifiers and comparators without gain control. A high useful level and thus a good signal-to-noise ratio are guaranteed by means of employing the avalanche photodiode. As a result, a DC transmission circuit is available with the special advantages of the optical waveguide. Electrical or electromagnetic fields cannot influence the optical waveguide. A direct evaluation of the level relationships is thus possible. The expense in the transmission of the information, the coding, and in the collision recognition is thus reduced and the methods thereby applied can be simplified. It is possible by means of employing a digitally variable transmitter in conjunction with the receiver constructed of DC-coupled amplifiers to determine a collision in that the level of the useful signal proportional to the light signal is sampled. The setting of the transmitter as well as of the second comparator stage can be automated. It is important for some bus access methods that an occurring collision is perceived by all computers connected to the bus, i.e. also by those computers which are not involved in the collision.

DESCRIPTION OF THE PREFERRED EMBODIMENTS

Figure 1:
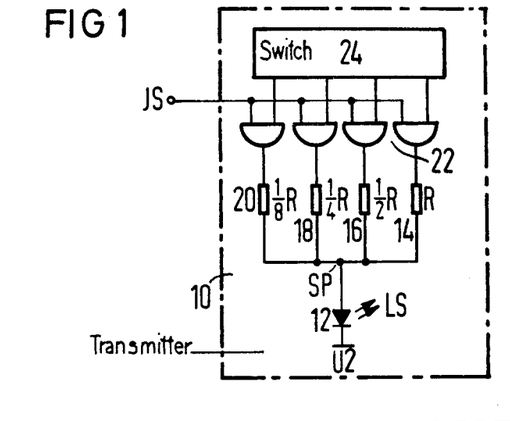
FIG. 1 illustrates a digitally variable transmitter for generating a 2-level light signal from a 2-level information signal.

Only transmitters and receivers are shown in the Figures, these working on a bus with an optical waveguide. The disposition of transmitters and receivers relative to the optical bus is known from the aforementioned prior art and is not further illustrated herein. A first embodiment of a digitally variable electro-optical transmitter is shown in FIG. 1. The bits of an information signal IS are serially supplied to the electro-optical transmitter 10. The transmitter 10 generates the light signals LS from the electrical information signal IS, the light signals LS being coupled into an optical waveguide. Employed for that purpose in the transmitter 10 is, for example, a light-emitting diode 12 which is traversed by a current proportional to the information signal IS and thus emits a corresponding light signal. The digital adjustability of the transmitter 10 is achieved with the assistance of setting resistors 14, 16, 18, and 20. The setting resistors 14 through 20 have various values as can be seen, for example, in FIG. 1. The setting resistors 14 through 20 are connected at one side to a star neutral point SP to which the diode 12 is also connected. The diode 12 is further connected to a second operating potential U2.

The selection of one of the setting resistors 14 through 20 occurs with the assistance of gate circuits 22. The information signal IS is supplied in common to the gate circuits 22. The selection of the gate circuits occurs with the assistance of a switch 24 which is connected to each gate circuit 22. The switch 24 can, for example, be a register connected to a computer which exhibits a register stage for each gate circuit 22. With the assistance of the switch 24, each gate circuit 22 can be separately driven, and thus the information signal can be conducted to the diode 12 over the driven gate circuit and the allocated setting resistor. The light energy emitted by the diode 12 is thus determined by the setting resistor.

Figure 4:
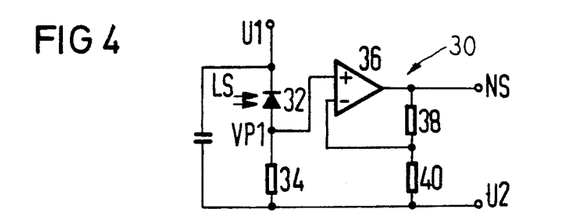
FIG. 4 illustrates a design of the input stage of the receiver.

A 2-level electrical information signal can be converted into a 2-level light signal LS with the assistance of the digitally adjustable transmitter 10. The light signal is transmitted over an optical waveguide and a mixer to a receiver. The structure of a receiver suitable for the evaluation of 2-level light signals is shown in FIGS. 4 and 5.

The receiver first contains an input stage 30 in which the light signals are in turn converted into electrical signals and amplified. The so-called useful signals NS are then emitted at the output of the input stage. The conversion of the light signals LS into electrical signals occurs with the assistance of an avalanche photodiode 32. This is connected to a first operating potential U1 and to a resistor 34 which is connected to the second operating potential U2. The junction VP1 between the diode 32 and the resistor 34 leads to the non-inverting input of a first operational amplifier 36. A voltage divider consisting of two resistors 38 and 40 is positioned between the output of the operational amplifier 36 and the second operating potential U2. The junction between the two resistors 38, 40 is connected to the inverting input of the operational amplifier 36. The useful signal NS is emitted at the output of the operational amplifier 36.

Figure 5:
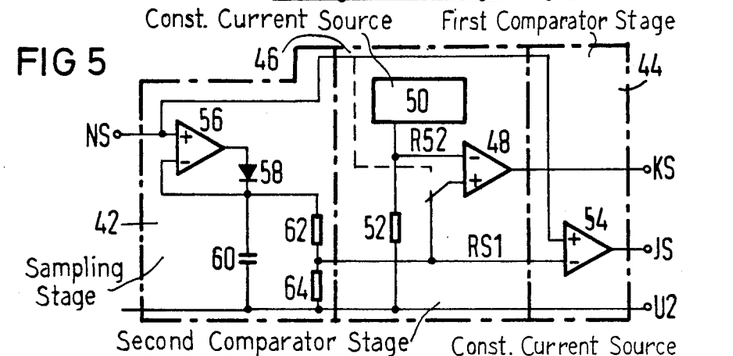
FIG. 5 illustrates a design of the sampling stage and of the comparator stages in the receiver upon evaluation of a 2-level light signal.

According to FIG. 5, the useful signal NS is supplied to a sampling stage 42, to a first comparator stage 44, and to a second comparator stage 46.

Whether a plurality of transmitters simultaneously transmit on the bus is determined with the assistance of the second comparator stage 46. The second comparator stage 46 is comprised of a second operational amplifier 48, of a constant current source 50, and of a resistor 52. The constant current source 50 is designed such that the currents it emits is variable in digital steps. The one input of the second operational amplifier 48 is connected to the output of the input stage. The other input of the operational amplifier 48 is connected to the junction between the constant current source 50 and the resistor 52. The collision signal KS is emitted at the output of the operational amplifier 48.

The reference voltage RS2 supplied to the second operational amplifier 48 can be set with the assistance of the constant current source 50 such that the collision signal is only emitted when at least two transmitters simultaneously request access to the bus.

The first comparator stage 44 again generates the information signal IS from the useful signal NS. The first comparator stage 44 consists of a third operational amplifier 54 to which the useful signal NS is supplied at one input and to which a reference voltage RS1 is supplied at the other input. This reference voltage can be such that the useful signal NS is subjected to a center sampling.

The reference voltage RS1 for the first comparator stage 44 can be gained with the assistance of the sampling stage 42. This consists of a fourth operational amplifier 56, of a diode 58, of a capacitor 60, and of a voltage divider consisting of two resistors 62, 64. The useful signal NS is supplied to the one input of the fourth operational amplifier 56. The output of the operational amplifier is connected over the diode 58 to the voltage divider 62, 64, to the capacitor 60, and to the inverting input of the operational amplifier 56. It is thus achieved that approximately the voltage which exists at the non-inverting input of the operational amplifier 56 appears at the capacitor 60. The capacitor 60 is charged to this voltage. With the assistance of the voltage divider 62, 64, the voltage on the capacitor 60 is set to the desired reference voltage for center sampling of the useful signals NS for the first comparator stage 44.

When during the transmission of the bits of an information block, the low level of the light signal prevails for a longer time, then the capacitor 60 assures that the reference voltage for the first comparator stage 44 does not vary. Given newly arriving blocks of bits, however, the sampling stage 42 automatically generates the correct value for the reference voltage for center sampling of the useful signals NS.

The bus system is operated in the following manner. The information signal IS to be transmitted is converted into light signals LS with the assistance of the transmitter 10. With the assistance of the switch 24, the transmitter 10 can be set such that the level of the light signals LS at the input of a mixer, for example, has a specific, fixed value. It can thus be achieved that the same level for the light signals is achieved at the input of the mixer for all transmitters connected to a bus. The light signals coupled into a light waveguide by the diode 12 are transmitted to the receiver over the optical waveguide and the mixer. There, they proceed to the input stage 30 and are in turn converted with the assistance of the diode 32 into electrical signals. The electrical signals are amplified into useful signals NS with the assistance of the input stage 30. The reference voltage RS1 for center sampling of the useful signals NS is gained from the useful signals NS with the assistance of the sampling stage 42 and is supplied to the first comparator stage 44, namely to the operational amplifier 54. The useful signals NS are simultaneously present at the operational amplifier 54. By means of comparing the useful signals NS to the first reference voltage RS1, it is determined whether the level of the useful signals NS lies above the reference voltage or below the reference voltage. Information signals IS are accordingly emitted at the output of the operational amplifier 54. The useful signals NS or the reference signal RS1 are supplied to the second comparator stage 46, namely to the Operational amplifier 48. The reference voltage RS2 continues to be present at the operational amplifier 48, said reference voltage RS2 being generated with the assistance of the constant current source 50. The reference voltage RS2 can be matched to the conditions on the receive side with the assistance of the constant current source 50, and a reference voltage RS2 can be formed that takes the specific transient responses of the individual receivers connected to the bus into consideration. The second comparator stage 46 always emits a collision signal KS at its output when either the reference voltage RS1 for center sampling of the useful signal NS or the useful signal NS exceeds the reference voltage RS2. Such a collision exists when two transmitters simultaneously work on the bus. Then, however, the level of the useful signal NS at each receiver is approximately twice as great as when only one transmitter transmits.

Because of the DC behavior of the transmission circuit, all current codings and methods can be applied to the transmission of the information over the transmission circuit. It must thereby be taken into consideration that a clock signal must be generated at the receive side in order to be able to fix the sampling time of the information signal. Given long strings of 0's or long strings of 1's during a block of bits of the information signal, synchronizing steps must be provided for the derivation of the clock signal. These are the start elements in the start/stop method, the influence of the scrambler given an unsolicited information flow, and the corresponding changes given self-clocking codings. Upon employment of the start/stop method, special attention must be given to the sampling stage since high speed demands are made of this. This also applies to the employment of scramblers and PLL's. It is possible to transmit the clock signals and the information signals superimposed with the assistance of a special trinary code. Nonetheless, the recovery of the clock only requires a very low cost.

Figure 7:
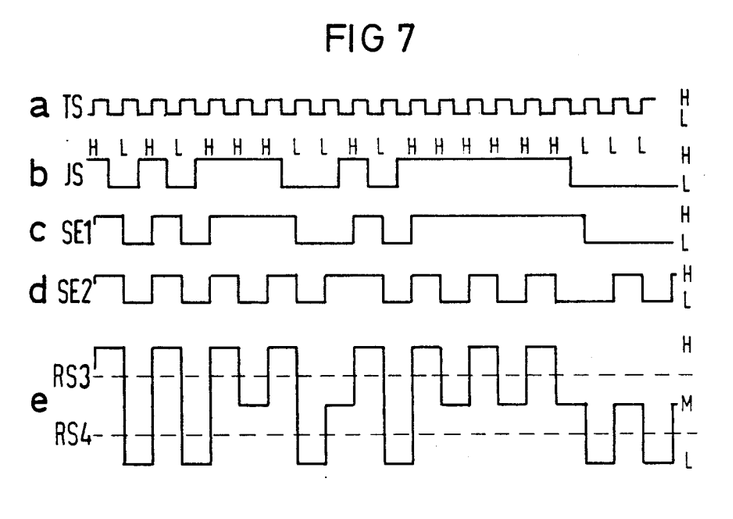
FIG. 7 illustrates the structure of the trinary code which is employed for the transmission of the 3-level light signal.

The format of the special trinary code derives from FIG. 7. Illustrated are, in line a, the clock signal TS and, in line b, the information signal which are supplied by the transmitting computer. The information signal in line b is referenced H at a high level and is referenced L at a low level. The binary 1 can be allocated to the high level H and the binary 0 can be allocated to the low level L. The information signal according to line b coded in that manner is converted into a trinary code which is illustrated in line e. This trinary code is characterized in that a level change occurs at each bit of the information signal to be transmitted. Accordingly, an H level in the trinary code is allocated to the H level of the bit of the information signal when this bit is preceded by a bit with an L level, or when given a sequence of a plurality of bits of the information signal having the H level, the bit is the $(2 \cdot n+1)^{th}$ bit $(n=0,1,2 \ldots)$ in said sequence. An L level in the trinary code is allocated to the L level of a bit of the information signal when the bit is preceded by a bit having the H level or when, given a sequence of a plurality of bits having the L level, the bit is the $(2 \cdot n+1)^{th}$ bit in said sequence. In contrast thereto, the trinary code exhibits a mean level (M level) when, given the sequence of a plurality of bits of the information signal having the H level or, respectively, the L level, the bit to be coded is the $(2 \cdot n)^{th}$ bit in the sequence.

Light signals which are constructed according to the trinary code according to line e can be transmitted without difficulty over an optical waveguide. Thus, however, it is guaranteed that a level change is present for each bit of the information signal in the trinary code, said level change being employable for the derivation of a clock signal at the receive side. For generating the L level of the light signal, the light source in the transmitter is shut off. Different light powers are allocated to the other two levels.

Figure 2:
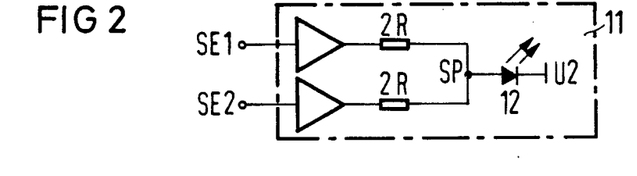
FIG. 2 illustrates a transmitter for generating a 3-level light signal from a 2-level information signal.

The light signals corresponding to the trinary code according to line e in FIG. 7 are generated with the assistance of an electro-optical transmitter 11 according to FIG. 2. For this purpose, first intermediate signals SE1 corresponding to line c and second intermediate signals SE2 corresponding to line d of FIG. 7 are formed from the information signal IS according to line b of FIG. 7. The intermediate signals SE1 and SE2 are superimposed in the transmitter according to FIG. 2 and are supplied to the diode 12. This emits corresponding light signals.

Figure 8:
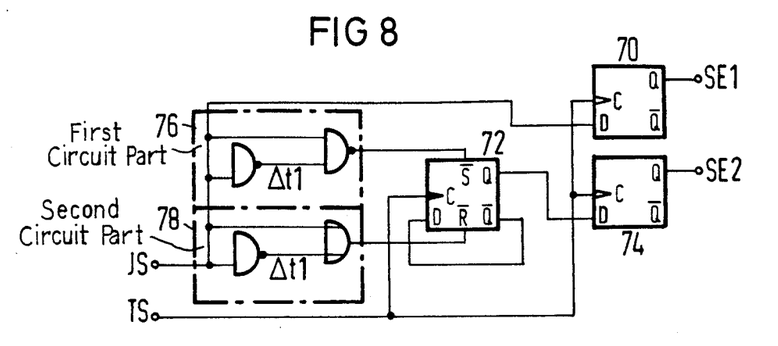
FIG. 8 illustrates a coding circuit for generating the signals for the transmitters according to FIGS. 2 and 3.

A coder circuit with which the intermediate signals SE1 and SE2 can be gained from the information signal IS is shown in FIG. 8. The intermediate signals SE1 are obtained with the assistance of a D-flip-flop 70. For this purpose, the information signal is supplied to the D input of the flip-flop 70 and the clock signals TS are supplied to the control input C. The intermediate signals SE1 which are merely chronologically offset relative to the information signal IS are emitted at the output of the flip-flop 70.

The intermediate signals SE2 are formed with the assistance of a bistable circuit 72 and a further D-flip-flop 74. These second intermediate signals SE2 have a H level when the trinary signal is to have an H level, and they have an L level when the trinary signal should have an L level. Given the sequence of bits of the information signal having the H level or the L level, the intermediate signal has the L level or the H level when the trinary signal should have an M level. When the leading edge of the information signal IS appears, a pulse which is supplied to the setting input S of the bistable circuit 72 is generated from the information signal IS with the assistance of the first circuit part 76. A pulse which is supplied to the reset input R of the bistable circuit 72 is obtained from the trailing edge of the information signal IS with the assistance of the second circuit part 78. The bistable circuit 72 is also negatively edge-controlled and its inverting output is connected to a D input. The bistable circuit 72 is thus set when a pulse is supplied to the setting input S. It is reset when a pulse is supplied to the reset input R. When neither a setting pulse nor a resetting pulse exists, then the bistable circuit 72 is constantly switched by the clock TS. The output of the bistable circuit 72 is connected to the D input of the D-flip-flop 74 which accepts the value of the bistable circuit 72 when the next clock signal TS appears.

Figure 3:
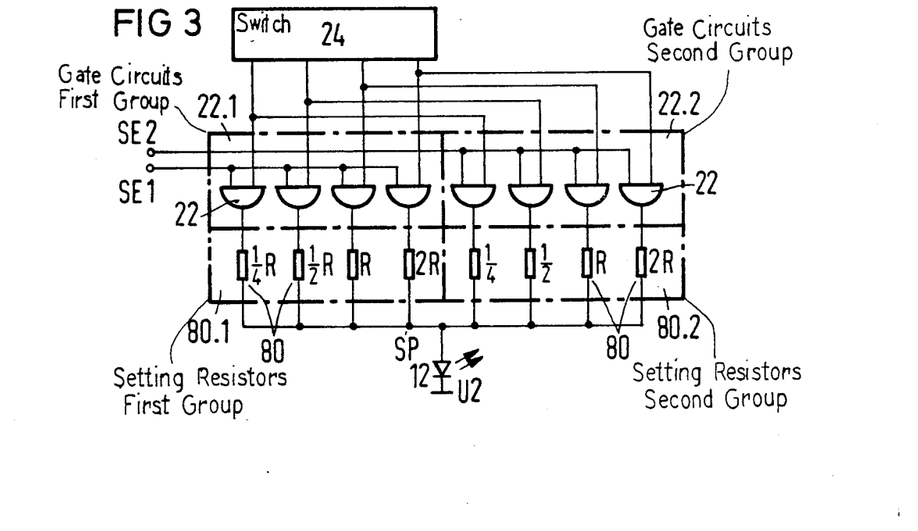
FIG. 3 illustrates a design of the transmitter according to FIG. 2, the transmitter being digitally variable.

In order to make the transmitter according to FIG. 2 variable in digital stages for the trinary coding, the transmitter according to FIG. 2 is modified in accordance with FIG. 3. First and second groups 80.1, 80.2 of setting resistors 80 are provided having various values according to FIG. 3. The resistors 80 form a star neutral point SP to which the diode 12 is connected. Further, the setting resistors 80 are connected to gate circuits 22 which are likewise combined group-wise. The intermediate signals SE1 are supplied in common to the first group of gate circuits 22.1 and the intermediate signals SE2 are supplied in common to the second group of gate circuits 22.2. The drive of the gate circuits 22.1 and 22.2 occurs with the assistance of a switch 24 which, for example, can consist of a register. During operation, those gate circuits in both groups of gate circuits are always respectively driven which correspond to the respective switch position so that the intermediate signals SE1 and SE2 are simultaneously conducted over some of the setting resistors 80.1 and 80.2 and are added. The sum of the intermediate signals SE1 and SE2 produces the trinary code which the light-emitting diode 12 couples into the optical waveguide as the light signal.

Figure 6:
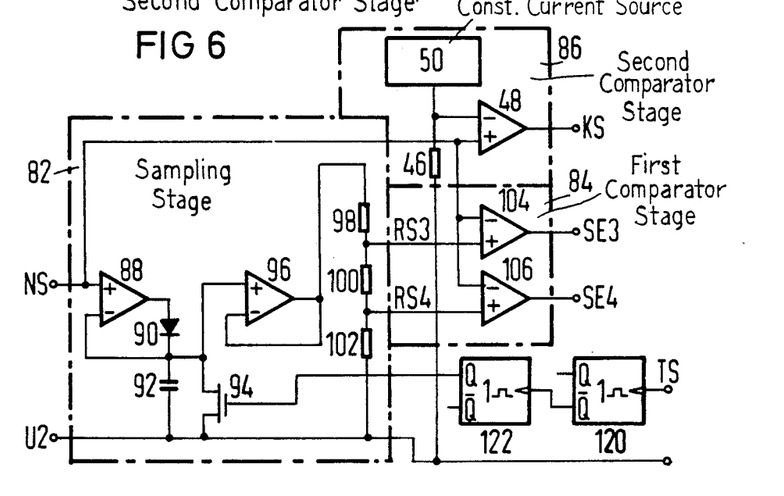
FIG. 6 illustrates a design of the sampling stage and comparator stages in the receiver given evaluation of a 3-level light signal.

The light signals coded in the trinary code, i.e. the three-level light signals transmitted over the optical waveguide, are converted into electrical signals by the avalanche photodiode 32, are amplified with the assistance of the preliminary or preselector stage 30, and are converted into useful signals NS. These useful signals NS are then supplied to a sampling stage 82, to a first comparator stage 84, and to a second comparator stage 86. The useful signal NS is supplied to the second comparator stage 86 in order to determine whether a collision exists. The second comparator stage is constructed in accordance with FIG. 5 and attention is drawn to the explanations to FIG. 5.

The sampling stage 82 first contains an operational amplifier 88, a diode 90, and a capacitor 92 which are constructed analogously to the sampling stage 42 of FIG. 5. Lying parallel to the capacitor 92, however, is not a voltage divider consisting of two resistors, but rather a logic element 94, for example a field effect transistor. The capacitor 92 can be very quickly discharged with the assistance of the field effect transistor 94. This is necessary when the transmission of a block of information is concluded. The voltage over the capacitor 92 is supplied over a voltage follower 96 to a voltage divider consisting of three resistors 98, 100, 102. Two reference voltages RS3 and RS4 are obtained with the assistance of the voltage divider 98, 100, and 102. The reference voltage RS3 is supplied to an operational amplifier 104. The reference voltage RS4 is supplied to an operational amplifier 106. Moreover, the useful signals NS are supplied to the operational amplifiers 104 and 106. The operational amplifier 104 always emits a signal SE3 when the useful signal NS exceeds the reference voltage RS3. Correspondingly, the operational amplifier 106 emits a signal SE4 when the useful signal NS falls below the reference signal RS4.

Figure 9:
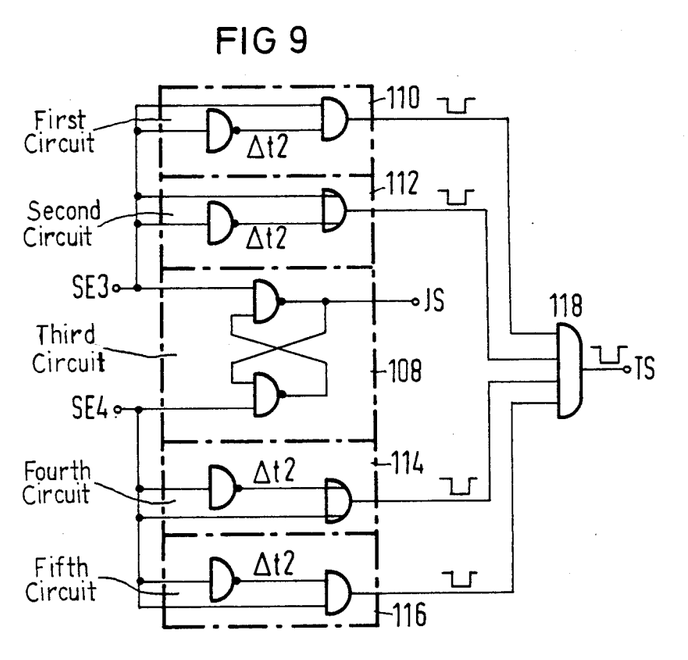
FIG. 9 illustrates a decoding circuit for the receiver which generates the 2-level information signal from the 3-level light signal and which generates the clock signals.

The information signal IS is regained from the signals SE3 and SE4 with the assistance of a decoder circuit according to FIG. 9. For this purpose, the signals SE3 and SE4 are supplied to a RS flip-flop 108 which in turn emits the information signal IS at its output.

The clock signals for the receiver, moreover, can be obtained with the assistance of the signals SE3 and SE4. This occurs with the assistance of the first through fifth circuits 110, 112, 108, 114 and 116 which generate pulses from the leading or respectively trailing edge of the signals SE3 and SE4, such pulses being combined into the clock signal TS with the assistance of a gate 118. The circuits 110, 112, 108, 114, and 116 generate a pulse when the leading edge of a signal SE3, SE4 is present. The circuit parts 112 and 114 generate a pulse when the trailing edge of SE3 and SE4 is present. The inverter elements referenced Δt2 in FIG. 9 have a delay time of half a bit time.

The drive of the logical element 94 in FIG. 6 occurs with the assistance of the clock signal TS which is supplied to a first one-shot multivibrator 120. The inverting output of the one-shot multivibrator 120 is applied to a second one-shot multivibrator 122. This only emits a signal when no further clock signals occur after the last clock signal. Thus, the capacitor 92 is discharged at the end of a transmission time and the capacitor 92 can again set itself to the level of the useful signals at the beginning of a new transmission of a block of the information signal.

Although various changes and modifications might be proposed by those skilled in the art, it will be understood that we wish to include within the claims of the patent warranted hereon all such changes and modifications as reasonably come within our contribution to the art.

We claim as our invention:

1. A bus system, comprising:
an optical waveguide system;
a plurality of electro-optical transmitter means each for converting a digital electrical information signal to be transmitted into light signal and for coupling it into the optical waveguide system;
a plurality of opto-electrical receiver means each without gain control and each having DC coupling through its entire signal receiving path for converting the light signal transmitted over the optical waveguide system into an electrical useful signal from which the information signal is recreated;
each of the transmitter means providing the light signal with a variable power level in selected steps so that power levels of the light signals on the waveguide system from all transmitter means functioning on the system can be set to substantially a same level; and
each of the receiver means comprising an input stage means for generating the useful signal, a sampling stage means for sampling the useful signal and creating a reference which is independent of information variations in the information signal which is adjusted based on useful signal levels and provides an approximate central referencing of the useful signal, a first comparator stage means connected to receive the useful signal from the input stage means and said reference for generating the information signal from the useful signal, a second comparator stage means having means for creating a selectable reference voltage amplitude variable in selected steps, the second comparator stage means comparing said sampling stage reference to the selected reference voltage so that a collision signal is only emitted when at least two transmitters simultaneously request access to the bus system, and wherein said means for creating a selectable reference voltage permits adjustment of the second comparator means reference voltage based upon system optical power levels and individual receiver means characteristics.

2. A bus system according to claim 1 wherein the input stage means comprises: an avalanche photodiode connected to a first operating potential and via a resistor is connected to a second operating potential; a first operational amplifier whose non-inverting input is connected to a junction of the diode and the resistor, and whose output is connected via a resistor to an inverting input; and a further resistor connected between the second operating potential and the resistor connected to the output of the operational amplifier.

3. A bus system according to claim 1 wherein the second comparator stage means comprises an operational amplifier whose one input is connected to receive the useful signal from the input stage means, and whose other input connects to a junction between a resistor connected to an operating potential and a digitally adjustable constant current source, and at an output of the operational amplifier the collision signal being available.

4. A bus system, comprising:
an optical waveguide system;
a plurality of electro-optical transmitter means each for converting a digital electrical information signal to be transmitted into a light signal and for coupling it into the optical waveguide system;
a plurality of opto-electrical receiver means each without gain control and each having DC coupling through its entire signal receiving path for converting the light signal transmitted over the optical waveguide system into an electrical useful signal from which the information signal is recreated;
each of the transmitter means providing the light signal with a variable power level in selected steps so that power levels of the light signals on the waveguide system from all transmitter means functioning on the system can be set to substantially a same level;
each of the receiver means comprising an input stage means for generating the useful signal, a sampling stage means for sampling the useful signal and creating a reference which is independent of information variations in the information signal, which is automatically adjusted based on useful signal levels, and provides an approximate central referencing of the useful signal, a first comparator stage means connected to receive the useful signal from the input stage means and said reference for generating the information signal from the useful signal, a second comparator stage means having means for creating a selectable reference voltage amplitude variable in selected steps, the second comparator stage means comparing the sampling stage means reference to the selected reference voltage so that a collision signal is only emitted when at least two transmitters simultaneously request access to the bus system, and wherein said means for creating a selectable reference voltage permits adjustment of the second comparator means reference voltage based upon system optical power levels and individual receiver means characteristics; and
the transmitter means generating a two-level light signal from a two-level electrical information signal, said transmitter means comprising a light-emitting diode lying between an operating potential and a star neutral point to which a plurality of setting resistors are connected, a plurality of gate circuits whose outputs are each respectively connected to a corresponding one of the setting resistors, whose first inputs are all connected in common to the information signal, and whose second inputs are all connected to a switch means.

5. A bus system according to claim 4 wherein a sampling stage means comprising an operational amplifier is provided whose non-inverting input is connected to an output of another operational amplifier, a diode connected between an output of said operational amplifier and its inverting input, and a capacitor connected between the output of said operational amplifier and said operating potential.

6. A bus system according to claim 5 wherein the first comparator stage means comprises a further operational amplifier whose first input is connected to the output of said another operational amplifier, and whose second input is connected to a voltage divider which is parallel to said capacitor connected to said operational amplifier.

7. A bus system, comprising:
an optical waveguide system;
a plurality of electro-optical transmitter means each for converting a digital electrical information signal to be transmitted into a light signal and for coupling it into the optical waveguide system;
a plurality of opto-electrical receiver means each without gain control and each having DC coupling through its entire signal receiving path for converting the light signal transmitted over the optical waveguide system into an electrical useful signal from which the information signal is recreated;
each of the transmitter means providing the light signal with a variable power level in selected steps so that power levels of the light signals on the waveguide system from all transmitter means functioning on the system can be set to substantially a same level;
each of the receiver means comprising an input stage means for generating the useful signal, a sampling stage means for sampling the useful signal and creating a reference which is independent of information variations in the information signal, which is automatically adjusted based on useful signal levels, and provides an approximate central referencing of the useful signal, a first comparator stage means connected to receive the useful signal from the input stage means and said reference for generating the information signal from the useful signal, a second comparator stage means having means for creating a reference voltage amplitude variable in selected steps and said second comparator stage means comparing said sampling stage means reference to the selected reference voltage so that a collision signal is only emitted when at least two transmitters simultaneously request access to the bus system, and wherein said means for creating a selectable reference voltage permits adjustment of the second comparator means reference voltage based upon system optical power levels and individual receiver means characteristics;
the transmitter means converting a two-level information signal to be transmitted into a three-level light signal, and wherein the transmitter means allocates an H level of the light signal to an H level of a bit of the information signal when this bit of the information signal is preceded by a bit of the information signal having an L level, or when given a sequence of a plurality of bits of the information signal having an H level, said bit of the information signal is the $(2\cdot n+1)^{th}$ bit $(n+0,1,2\ldots)$ of this sequence;
said transmitter means allocating an L level of the light signal to the L level of a bit of the information signal when said bit of the information signal is preceded by a bit of the information signal having the H level, or when given a sequence of a plurality of bits of the information signal having the L level, said bit is the $(2n+1)^{th}$ bit in the sequence; and
the transmitter means allocating an M level of the light signal to the H level or L level respectively of the bit information signal given a sequence of a plurality of bits of the information signal having the H level or L level respectively, said bit being the $(2\cdot n)^{th}$ bit in this sequence.

8. A bus system according to claim 7 including a coder circuit means to which a clock signal and the 2-level information signal are supplied and which generates a first 2-level intermediate signal with the information signal which has some variations as but with a given time offset with respect to the information signal, said coder circuit means also generating a second 2-level intermediate signal which has the H level corresponding to a single bit of the information signal when the light signal should have the H level, has the L level corresponding to a single bit of the information signal when the light signal should have the L level, which given a sequence of two successive bits of the information signal having the H level has the L level during a second of the two bits, and given a sequence of two successive bits of the information signal having the L level has the H level during a second of the two bits, so that the light signal should have the M level during the second of the two bits.

9. A bus system according to claim 8 wherein the coder circuit means comprises a first edge-controlled D flip-flop to whose D input the information signals are supplied, to whose control input clock signals are supplied, and at whose output the first intermediate signal is present.

10. A bus system according to claim 9 wherein the coder circuit means further comprises a bistable circuit negatively edge-controlled by the clock signals, its inverting output being connected to its D input, its setting input having a pulse supplied to it when the leading edge of the information signal appears, and its reset input having a pulse supplied to it when the trailing edge of the information signal appears; and a D-flip-flop edge-controlled by the clock signals, its D input being connected to the output of the bistable circuit and the second intermediate signals appearing at its output.

11. A bus system according to claim 8 wherein in generating the 3-level signal, the first and second intermediate signals are superimposed in the transmitter means and the superimposed signal is preset at an output for transmission by a light emitting source.

12. A bus system, comprising:
an optical waveguide system;
a plurality of electro-optical transmitter means each for converting a digital electrical information signal to be transmitted into a light signal and for coupling it into the optical waveguide system;
a plurality of opto-electrical receiver means each without gain control and each having DC coupling through its entire signal receiving path for converting the light signal transmitted over the optical waveguide system into an electrical useful signal from which the information signal is recreated;
each of the transmitter means providing the light signal with a variable power level in selected steps so that power levels of the light signals on the waveguide system from all transmitter means functioning on the system can be set to substantially a same level;

each of the receiver means comprising an input stage means for generating the useful signal, a sampling stage means for sampling the useful signal and creating a reference which is independent of information variations in the information signal, which is automatically adjusted based on useful signal levels, and provides an approximate central referencing of the useful signal, a first comparator stage means connected to receive the useful signal from the input stage means and said reference for generating the information signal from the useful signal, a second comparator stage means having means for creating a reference voltage amplitude variable in selected steps, the second comparator stage means comparing said sampling stage means reference to the selected reference voltage so that a collision signal is only emitted when at least two transmitters simultaneously request access to the bus system, and wherein said means for creating a selectable reference voltage permits adjustment of the second comparator means reference voltage based upon system optical power levels and individual receiver means characteristics;

the transmitter means having the light-emitting source connected between an operating potential and a star neutral point to which first and second groups of setting resistors are connected, values of the first group of setting resistors being substantially identical to values of the setting resistors of the second group; and a plurality of gate circuits identical in number to the plurality of the setting resistors of both groups, the setting resistors being connected to outputs of said gate circuits, first inputs of the gate circuits being connected to a switch and their second inputs being combined to form first and second groups, a first intermediate signal being supplied to the first group of gate circuits, and a second intermediate signal being supplied to the second group of gate circuits.

13. A bus system, comprising:
an optical waveguide system;
a plurality of electro-optical transmitter means each for converting a digital electrical information signal to be transmitted into a light signal and for coupling it into the optical waveguide system;
a plurality of opto-electrical receiver means each without gain control and each having DC coupling through its entire signal receiving path for converting the light signal transmitted over the optical waveguide system into an electrical useful signal from which the information signal is recreated;
each of the transmitter means providing the light signal with a variable power level in selected steps so that power levels of the light signals on the waveguide system from all transmitter means functioning on the system can be set to substantially a same level;
each of the receiver means comprising an input stage means for generating the useful signal, a sampling stage means for sampling the useful signal and creating a reference which is independent of information variations in the information signal, which is automatically adjusted based on useful signal levels, and provides an approximate central referencing of the useful signal, a first comparator stage means connected to receive the useful signal from the input stage means and said reference for generating the information signal from the useful signal, a second comparator stage means having means for creating a reference voltage amplitude variable in selected steps, the second comparator stage means comparing said sampling stage means reference to the selected reference voltage so that a collision signal is only emitted when at least two transmitters simultaneously request access to the bus system, and wherein said means for creating a selectable reference voltage permits adjustment of the second comparator means reference voltage based upon system optical power levels and individual receiver means characteristics; and said receiver means comprising a sampling stage comprising a first operational amplifier whose non-inverting input is connected to an output of a second operational amplifier in the input stage means, the first amplifier output being connected over a series connection of a diode and a capacitor to an operating potential, and whose inverting input is connected to a junction between said diode and said capacitor; logic means arranged parallel to the capacitor and which is switched active when transmission of an information block is terminated; and a voltage divider of three resistors having first and second junctions and which is connected parallel to the capacitor via a voltage follower.

14. A bus system according to claim 13 wherein the receiver means further comprises: a first comparator stage formed of a third operational amplifier whose inverting input is connected to the output of the second operational amplifier in the input stage means, whose non-inverting input is connected to said first junction of said voltage divider for tapping a first reference voltage and at whose output first signals appear when the first reference voltage is moved upwardly by the useful signal; a fourth operational amplifier whose inverting input is connected to the output of the second operational amplifier in the input stage means, whose non-inverting input is connected to the second junction of the voltage divider for tapping a second reference voltage, and at whose output second signals appear when the useful signal moves the second reference voltage downwardly; and an RS flip-flop whose one input is connected to an output of the third operational amplifier and whose other input is connected to an output of the fourth operational amplifier and which emits the information signal at its output.

15. A bus system according to claim 14 wherein the receiver means includes circuit means for generating clock signals from said first and second signals; and first through fifth circuit means all connected to a common gate and which, given appearance of an edge of the first and second signal, generates a pulse which is transmitted to the gate so as to form the clock signal at an output of the gate.

16. A bus system, comprising:
an optical waveguide system;
a plurality of electro-optical transmitter means each for converting a digital electrical information signal to be transmitted into a light signal and for coupling it into the optical waveguide system;
a plurality of opto-electrical receiver means each without gain control and each having DC coupling through its entire signal receiving path for converting the light signal transmitted over the optical waveguide signal into an electrical useful signal from which the information signal is recreated;

each of the transmitter means providing the light signal with a variable power level in selected steps so that power levels of the light signals on the waveguide system from all transmitter means functioning on the system can be set to substantially a same level;

each of the receiver means comprising an input stage means for generating the useful signal, a sampling stage means for sampling the useful signal and creating a reference which is independent of information variations in the information signal, which is automatically adjusted based on useful signal levels, and provides an approximate central referencing on the useful signal, a first comparator stage means connected to receive the useful signal from the input stage means and said reference for generating the information signal from the useful signal, a second comparator stage means having means for creating a reference voltage amplitude variable in selected steps, the second comparator stage means comparing said sampling stage means reference to the selected reference voltage so that a collision signal is only emitted when at least two transmitters simultaneously request access to the bus system, and wherein said means for creating a selectable reference voltage permits adjustment of the second comparator means reference voltage based upon system optical power levels and individual receiver means characteristics; and a light source being provided for generating said light signal, the light source being shut off given an L-level of the light signal.

17. The bus system according to claim 1 wherein a sampling stage means connects the useful signal to the second comparator stage means.

* * * * *